United States Patent
Zhu et al.

(10) Patent No.: US 12,332,212 B2
(45) Date of Patent: Jun. 17, 2025

(54) METHOD FOR CHARACTERIZING THE GAS LOAD OF A MEDIUM, AND DENSITY METER THEREFOR

(71) Applicant: Endress+Hauser Flowtec AG, Reinach (CH)

(72) Inventors: Hao Zhu, Freising (DE); Yaoying Lin, Freising (DE); Andreas Güttler, Zolling (DE)

(73) Assignee: Endress+Hauser Flowtec AG, Reinach (CH)

( * ) Notice: Subject to any disclaimer, the term of this patent is extended or adjusted under 35 U.S.C. 154(b) by 358 days.

(21) Appl. No.: 17/757,496

(22) PCT Filed: Dec. 1, 2020

(86) PCT No.: PCT/EP2020/084083
§ 371 (c)(1),
(2) Date: Jun. 16, 2022

(87) PCT Pub. No.: WO2021/121961
PCT Pub. Date: Jun. 24, 2021

(65) Prior Publication Data
US 2023/0026350 A1    Jan. 26, 2023

(30) Foreign Application Priority Data
Dec. 19, 2019    (DE) .......................... 102019135299.1

(51) Int. Cl.
*G01N 29/036*    (2006.01)

(52) U.S. Cl.
CPC . *G01N 29/036* (2013.01); *G01N 2291/02433* (2013.01)

(58) Field of Classification Search
CPC ....... G01N 29/036; G01N 2291/02433; G01N 29/024; G01F 1/74; G01F 1/8436; G01F 15/024
See application file for complete search history.

(56) References Cited

U.S. PATENT DOCUMENTS

| | | | |
|---|---|---|---|
| 7,380,439 B2 * | 6/2008 | Gysling | G01N 9/002 73/32 A |
| 2007/0186686 A1 * | 8/2007 | Drahm | G01F 1/8413 73/861.357 |

(Continued)

FOREIGN PATENT DOCUMENTS

| DE | 10044491 A1 | 4/2002 |
|---|---|---|
| DE | 102008016523 A1 | 10/2009 |

(Continued)

OTHER PUBLICATIONS

B. Liu et al. "Investigations into the behaviors of Coriolis flowmeters under air-water two-phase flow conditions on an optimized experimental platform," 2018 IEEE International Instrumentation and Measurement Technology Conference (I2MTC), Houston, TX, USA, 2018, pp. 1-6 (Year: 2018).*

(Continued)

*Primary Examiner* — Eman A Alkafawi
*Assistant Examiner* — Dilara Sultana
(74) *Attorney, Agent, or Firm* — Christopher R. Powers; Endress+Hauser (USA) Holding, Inc.

(57) ABSTRACT

A method for characterizing the gas load of a medium, which comprises a liquid loaded with gas, using a measurement sensor that guides the medium in at least one vibrating measurement tube, includes: determining a speed of sound value and a resonator density value of the medium based on natural frequencies of at least two different vibration modes of the measurement tube; determining a measured pressure value for the medium guided in the measurement tube;

(Continued)

determining a gas volume content of suspended bubbles in the medium based on the resonator density value, the speed of sound value and the measured pressure value; and determining a value for the gas volume content of free bubbles based on the resonator density value of the medium and the gas volume content of suspended bubbles.

13 Claims, 2 Drawing Sheets

(56) References Cited

U.S. PATENT DOCUMENTS

| | | |
|---|---|---|
| 2011/0036179 A1 | 2/2011 | Weinstein |
| 2016/0041286 A1* | 2/2016 | Sinha .................. G01F 1/74 73/152.32 |

FOREIGN PATENT DOCUMENTS

| | | | |
|---|---|---|---|
| DE | 102015122661 A | 12/2015 | |
| DE | 102016005547 A1 | 11/2017 | |
| DE | 102016112002 A1 * | 1/2018 | ............... G01F 1/74 |
| DE | 102016114972 A1 * | 2/2018 | |
| DE | 102016114974 A1 * | 2/2018 | |
| DE | 102017131267 A1 | 6/2019 | |
| DE | 102018112002 A1 | 7/2021 | |

OTHER PUBLICATIONS

Ceglia, Paul, et al., Entrained gas handling in Promass Coriolis flowmeters, White Paper, Endress+Hauser, https://www.endress.com/en/search?s.category=search-download&s3.termOverride=entri%20ga&filter.text=entrained%20Gas, (last accessed Dec. 20, 2024).

* cited by examiner

METHOD FOR CHARACTERIZING THE GAS LOAD OF A MEDIUM, AND DENSITY METER THEREFOR

CROSS-REFERENCE TO RELATED APPLICATIONS

The present application is related to and claims the priority benefit of German Patent Application No. 102019135299.1, filed on Dec. 19, 2019, and International Patent Application No. PCT/EP2020/084083, filed Dec. 1, 2020, the entire contents of which are incorporated herein by reference.

TECHNICAL FIELD

The present invention relates to a method for characterizing the gas load of a medium comprising a liquid loaded with gas, and to a density meter configured to carry out the method.

BACKGROUND

It is known from published patent application DE 10 2017 131 267 A1 to determine the gas load of a liquid on the basis of the resonator effect and the Sorokine equation. However, the gas load determined in this way leaves something to be desired in that, on the one hand, suspended and, on the other, free bubbles occur in liquids and have different effects on the measurement of parameters of the medium, such as the density or flow rate thereof.

SUMMARY

It is therefore the aim of the present invention to provide a method and a density meter for carrying out the method, which enable a more differentiated characterization of the gas load of a medium.

The aim is achieved by the method and the density meter according to the present disclosure.

The method according to the invention serves to characterize the gas load of a medium, which comprises a liquid loaded with gas, by means of a measurement sensor which guides the medium in at least one vibrating measurement tube, wherein the method comprises:

determining a speed of sound value and a resonator density value of the medium on the basis of the natural frequencies of at least two different vibration modes of the measurement tube;

determining a measured pressure value for the medium guided in the measurement tube and the natural frequencies of at least two different vibration modes of the measurement tube;

determining a speed of sound value and a resonator density value of the medium on the basis of the natural frequencies of the at least two different vibration modes of the at least one measurement tube;

determining a value for the gas volume content of free bubbles as a function of the resonator density value of the medium, and of the gas volume content of suspended bubbles.

In an embodiment of the invention, the value for the gas volume content of free bubbles is proportional to a difference between an expected value of the media density on the basis of a reference density value of the liquid and of the gas volume content of the suspended bubbles on the one hand, and of the resonator density value on the other.

In an embodiment of the invention, in order to determine the value for the gas volume content of free bubbles, said difference is divided by a product of the expected value of the media density on the basis of the reference density value of the liquid and of the gas volume content of the suspended bubbles on the one hand, and a correction factor on the other, wherein the correction factor is not less than 1 and not greater than 4, and in particular not greater than 3.

In an embodiment of the invention, the correction factor depends upon the expected mobility and/or the Stokes number of the free bubbles in the liquid.

In an embodiment of the invention, the correction factor has the value 2.

In an embodiment of the invention, the gas volume content of the suspended bubbles is determined on the basis of the Sorokine equation.

In an embodiment of the invention, the resonator density value is determined on the basis of the natural frequencies of the F1 bending vibration mode and the F2 bending vibration mode or the F3 bending vibration mode.

In an embodiment of the invention, the measurement sensor has at least two different measurement tubes, in which similar bending vibration modes have different natural frequencies, wherein the resonator density value is determined on the basis of the different natural frequencies of two, similar bending vibration modes, and in particular the two F1 bending vibration modes of the different measurement tubes.

In an embodiment of the invention, a mixed-phase density value for the medium is determined as a function of the gas volume content of suspended bubbles and of the gas volume content of free bubbles.

In an embodiment of the invention, the method is carried out iteratively at least in part, wherein, in a second iteration, the determined mixed-phase density value is used instead of the resonator density value to determine the gas volume content of suspended bubbles.

In an embodiment of the invention, at least one of the following values provided as measured values is output: the mixed-phase density value, the gas volume content of free bubbles, the gas volume content of suspended bubbles, and the sum of the aforementioned gas volume contents.

The density meter according to the invention comprises:
a measurement sensor with at least one measurement tube that can be excited to vibrate and is used for guiding a flowable medium;
an exciter for exciting the vibrations;
at least one vibration sensor for detecting vibration-dependent signals; and
a measuring and operating circuit configured to drive the exciter, to detect the vibration-dependent signals, and to carry out the method according to the invention.

In an embodiment of the invention, the at least one measurement tube is a measurement tube of a pair of substantially identical measurement tubes which can be excited to vibrate against one another.

BRIEF DESCRIPTION OF THE DRAWINGS

The invention is now described in greater detail based upon the exemplary embodiment illustrated in the figures. The following are shown.

DETAILED DESCRIPTION

Figure 1:
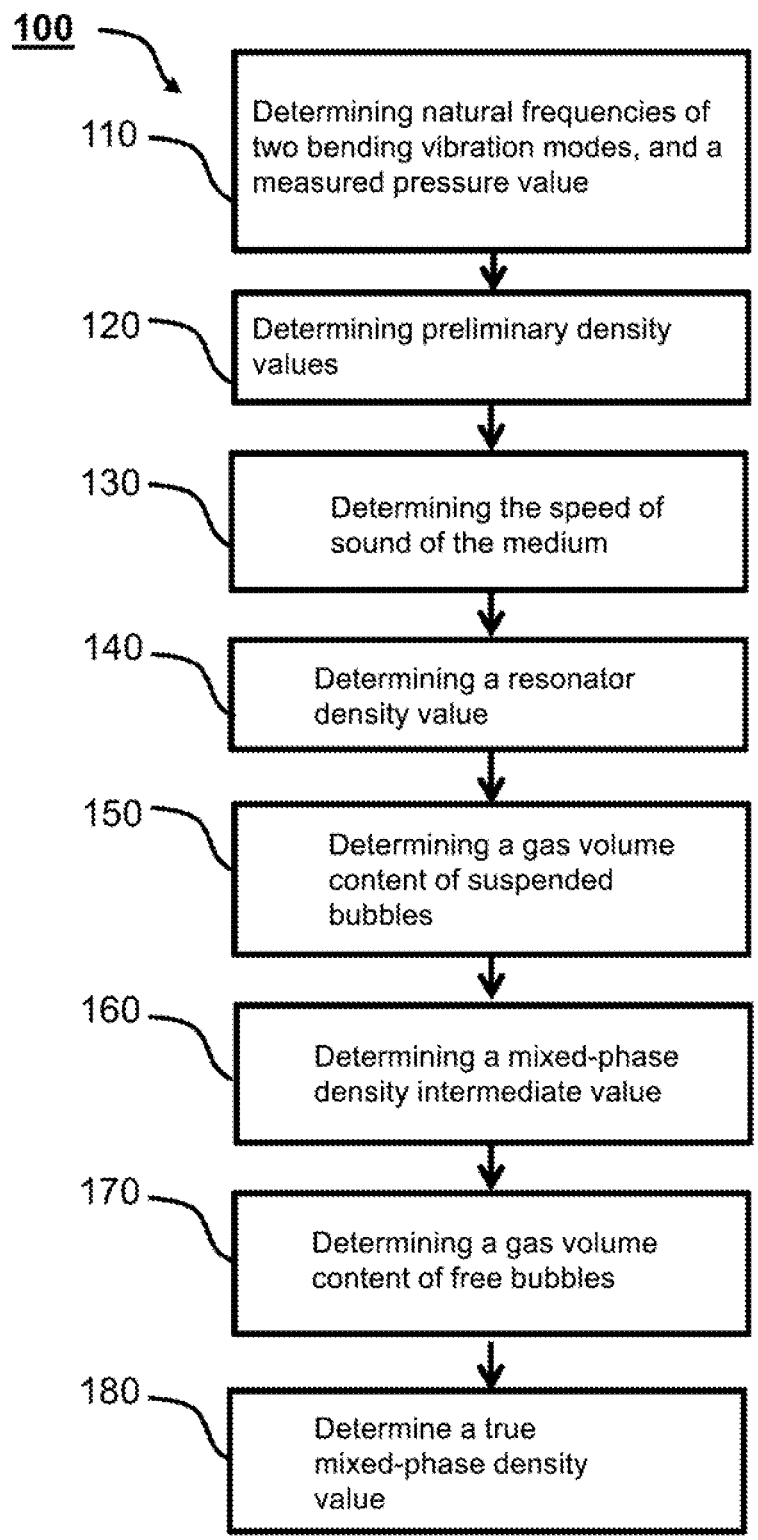
FIG. 1 shows a flowchart of an exemplary embodiment of the method according to the present disclosure.

The exemplary embodiment, shown in FIG. 1, of a method 100 according to the invention for characterizing a liquid loaded with gas begins in a step 110 with the determination of the natural frequencies of the $f_1$ bending vibration mode and the $f_3$ bending vibration mode of a measurement tube pair of a Coriolis mass flow meter, which is used here in particular as a density sensor. For this purpose, the $f_1$ bending vibration mode and the $f_3$ bending vibration mode can in particular be excited simultaneously. By maximizing the ratio of the vibration amplitude to the mode-specific excitation power by varying the excitation frequencies, the sought natural frequencies can be determined. Furthermore, a measured pressure value p applicable at the time of the frequency measurement is detected.

Based upon the determined natural frequencies fi, preliminary density values $\rho_1$ and $\rho_3$ are determined in a step 120 as follows:

$$\rho_i = c_{0i} + c_{1i}\frac{1}{f_i^2} + c_{2i}\frac{1}{f_i^4}, \quad (i)$$

where $c_{0i}$, $c_{1i}$, and $c_{2i}$ are mode-dependent coefficients.

In a step 130, which is explained in more detail below, the speed of sound of the liquid loaded with gas and a mode-specific resonator correction term $K_{res-i}$ for the density measurement are determined.

Subsequently, in a step 140, the speed of sound $c_{res}$ is used to determine a resonator density value $\rho_{res}$ for the liquid loaded with gas.

Using the current measured pressure value p for the liquid loaded with gas, the speed of sound thereof $c_{res}$, and the resonator density value $\rho_{res}$, a gas volume content of suspended bubbles $\alpha_{susp}$ is determined in a step 150.

On the basis of the gas volume content of suspended bubbles $\alpha_{susp}$, and with knowledge of the density of the pure liquid phase $\rho_l$, a mixed-phase density intermediate value $\rho_{l-susp}$ for the density of the liquid loaded with gas can be determined in a next step 160.

$$\rho_{l-susp} = \rho_l *(1-\alpha_{susp}) \quad (ii)$$

Based upon a difference between the mixed-phase density intermediate value $\rho_{l-susp}$ and the resonator density value $\rho_{res}$, the gas volume content $\alpha_{free}$ of free bubbles can be calculated for $\rho_{res} < \rho_{l-susp}$ in the next step 170 as follows:

$$\alpha_{free} = \frac{\rho_{l-susp} - \rho_{res}}{k_{gas} * \rho_{l-susp}} \quad (iii)$$

In this case, $k_{gas}$ is a correction factor with a value between 1 and 3, which depends upon the Stokes number of the gas bubbles, and is estimated well with 2 for most cases. For $\rho_{res} > \rho_{l-susp}$, the following applies: $\alpha_{free} = 0$.

For a true mixed-phase density value $\rho_{mix}$, the following is thus obtained in a subsequent step 180:

$$\rho_{mix} = \rho_l *(1-\alpha_{susp}-\alpha_{free}) \quad (iv)$$

In addition to this mixed-phase density value, the individual gas volume contents $\alpha_{susp}$ and $\alpha_{free}$ as well as the sum thereof can be output as a value for the total gas volume content $\alpha_{total}$. On the basis of these gas volume contents and a flow variable, the flow regime in a flowing medium, for example, can be characterized.

Details relating to the method steps are explained below:

In order to determine the resonator correction term $K_{res-i}$ for calculating a resonator density value $\rho_{res}$, initially, the ratio V of the preliminary density values, i.e., for example, the division of the preliminary density values $\rho_1$ and $\rho_3$, is calculated as follows:

$$V := \rho_1/\rho_3.$$

A value of the speed of sound $c_{res}$ is subsequently determined and, with the measured natural frequencies $f_1$ and $f_3$ of the bending vibration modes, results, in the following equation, in the observed ratio V of the preliminary density values:

$$\frac{\left(1 + \frac{r}{\left(\frac{g \cdot c_{res}}{f_1}\right)^2 - b}\right)}{\left(1 + \frac{r}{\left(\frac{g \cdot c_{res}}{f_3}\right)^2 - b}\right)} = V \quad (v)$$

where r is approximately 0.84, b=1, and g is a measurement-tube-dependent proportionality factor between speed of sound $c_{res}$ and resonance frequency and can, for example, assume a value of 10/m. The value of the speed of sound $c_{res}$, which satisfies the above equation, is the sought value for the speed of sound of the liquid loaded with gas.

Based upon the determined speed of sound value $c_{res}$, a mode-specific correction term $K_{res-i}$ can then be calculated for the resonator effect as follows:

$$K_{res-i} := \left(1 + \frac{r}{\left(\frac{g \cdot c_{res}}{f_i}\right)^2 - 1}\right) \quad (vi)$$

The resonator density value $\rho_{res}$ can be calculated in the next step 140 as:

$$\rho_{res} := \frac{\rho_i}{K_{res-i}} \quad (vii)$$

Furthermore, according to Sorokine, the following relationship exists between the speed of sound cmix of a liquid loaded with gas and further parameters:

$$c_{S-mix} = \left[\frac{\alpha_s}{c_g^2} + \frac{(1-\alpha_s)^2}{c_l^2} + \frac{\alpha_s(1-\alpha_s) \cdot \rho_l}{\gamma \cdot p}\right]^{-\frac{1}{2}} \quad (viii)$$

In this case, $\alpha_s$ is a gas volume content (or the gas void fraction GVF), $c_g$ is the speed of sound of the pure gas, ci is the speed of sound of the pure liquid, y is the adiabatic coefficient for the gas, p is the current pressure of the liquid loaded with gas, and pi is the density of the pure liquid.

The mixture density value according to Sorokine $\rho_{S\text{-}mix}$ is linked with the density of the liquid phase $\rho_l$ and the gas density via the gas volume content a by:

$$\rho_{S\text{-}mix} = \rho_l(1-\alpha_s) + \rho_g\alpha_s \quad \text{(ix)}$$

Since the liquid density is significantly greater than the gas density, and since the gas volume content is usually in the single-digit percentage range, the following approximation applies:

$$\rho_{S\text{-}mix} \approx \rho_l(1-\alpha_s) \quad \text{(x)}$$

Thus, equation (viii) may be rewritten as:

$$c_{S\text{-}mix} = \left[\frac{\alpha_s}{c_g^2} + \frac{(1-\alpha_s)^2}{c_l^2} + \frac{\alpha_s \rho_{S\text{-}mix}}{\gamma p}\right]^{-\frac{1}{2}} \quad \text{(xi)}$$

By disregarding square terms in $\alpha$, the following is obtained:

$$c_{S\text{-}mix} = \left[\frac{\alpha}{c_g^2} + \frac{1-2\alpha_s}{c_l^2} + \frac{\alpha_s \rho_{S\text{-}mix}}{\gamma p}\right]^{-\frac{1}{2}} \quad \text{(xii)}$$

By solving equation xii for $\alpha_s$, an expression for calculating the gas volume content according to Sorokine is found:

$$\alpha_s = \frac{\frac{1}{c_{S\text{-}mix}^2} - \frac{1}{c_l^2}}{\frac{1}{c_g^2} - \frac{2}{c_l^2} + \frac{\rho_{S\text{-}mix}}{\gamma P}} \quad \text{(xiii)}$$

By disregarding the terms with $(1/c_l)^2$ and $(1/c_g)^2$, which is justified for pressure values up to a few bar, a value for the gas volume content $\alpha$ with a relative accuracy in the lower single-digit percentage range is obtained:

$$\alpha_s = \frac{\gamma p}{c_{S\text{-}mix}^2 \rho_{S\text{-}mix}} \quad \text{(xiv)}$$

If, in equations xiii or xiv, the mixed speed of sound $c_{S\text{-}mix}$ is replaced by the speed of sound $c_{res}$ found with equation v, and the mixed density value $\rho_{S\text{-}mix}$ according to Sorokine is replaced by the resonator density value $\rho_{res}$ determined in equation vii, the gas volume content as according to Sorokine corresponds to the gas volume content $\alpha_{susp}$ of suspended bubbles, which is used in equations ii and iv.

In a second iteration, instead of the resonator density value $\rho_{res}$, the true mixed-phase density value $\rho_{mix}$ found with equation iv in a first iteration can, in equations xiii or xiv, be used for the mixed density value $\rho_{S\text{-}mix}$ according to Sorokine. The gas volume content $\alpha_s$ according to Sorokine thus found is in turn used as gas volume content $\alpha_{susp}$ of suspended bubbles in equations ii to determine a new mixed-phase density intermediate value $\rho_{l\text{-}susp}$, which is then used in equation iii in order to determine a second value for the gas volume content of free bubbles. The values for the gas volume contents determined iteratively in this way are then used in equation iv to obtain a second, true, mixed-phase density value $\rho_{mix}$. If necessary, this iteration can be continued until a convergence criterion is fulfilled. However, experience has shown that one iteration is already completely sufficient.

Figure 2A:
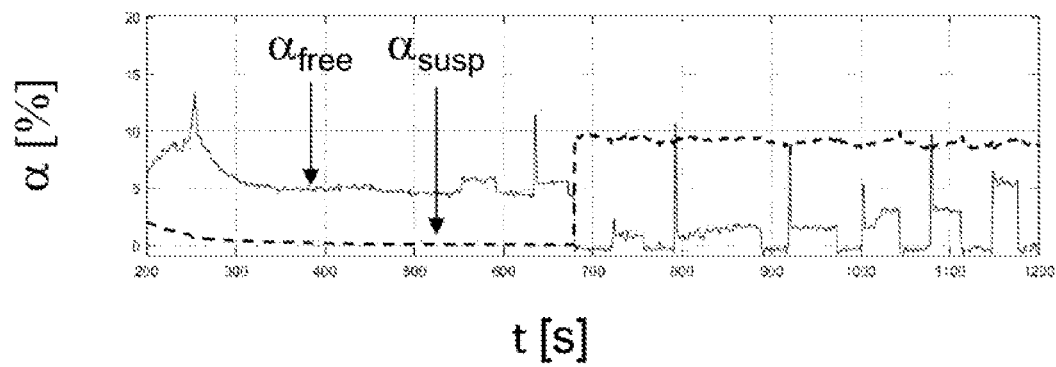
FIG. 2a shows measurement data obtained using the method according to the present disclosure, regarding gas volume contents.
Figure 2B:
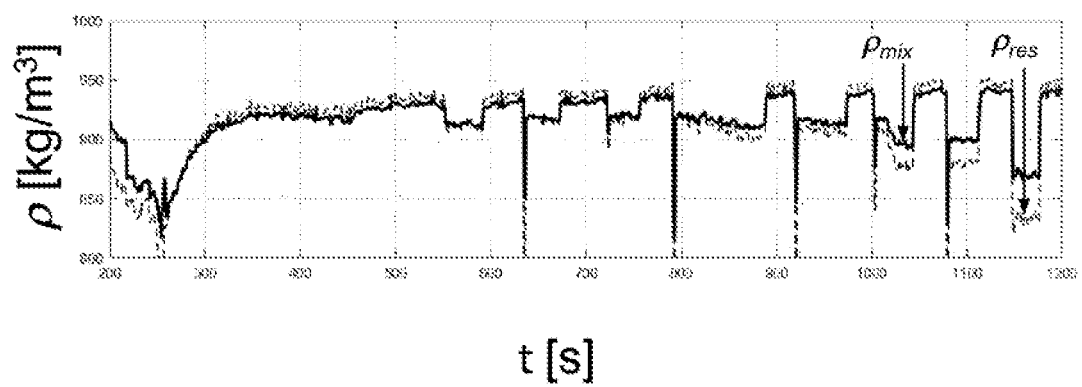
FIG. 2b shows an associated density determination according to the prior art and according to the method according to the present disclosure.

The diagram in FIG. 2a shows measurement data, collected using the method according to the invention, for the gas volume contents of gum arabic into which air has been introduced. The dashed line shows the gas volume content $\alpha_s$ of suspended bubbles, while the solid line illustrates the gas volume content $\alpha_{free}$ of free bubbles. Depending upon the type of introduction, the various gas volume contents change significantly. The method according to the invention is able to distinguish between the two types of gas load and to generate accurate measured values for the respective gas volume contents. The diagram in FIG. 2b shows, with a dashed line, the resonator density values $\rho_{res}$ resulting according to equation vii according to the prior art and, with a solid line, the mixed-phase density values $\rho_{mix}$ according to equation iv according to the invention. The determination of the mixed-phase density according to the invention proves to be superior in the determination of density, when different types of gas load are given.

The invention claimed is:

1. A method for characterizing a gas load of a medium, which comprises a liquid loaded with gas, the method comprising:
   providing a measurement sensor comprising at least one vibrating measurement tube, the measurement sensor configured to guide the medium through the at least one measurement tube;
   determining a measured pressure value for the medium guided in the at least one measurement tube;
   determining natural frequencies of at least two different vibration modes of the at least one measurement tube;
   determining a speed of sound value and a resonator density value of the medium based on the natural frequencies of the at least two different vibration modes of the at least one measurement tube;
   determining a gas volume content of suspended bubbles in the medium based on the resonator density value, the speed of sound value, and the measured pressure value; and
   determining a value for the gas volume content of free bubbles as a function of the resonator density value of the medium and as a function of the gas volume content of the suspended bubbles,
   wherein the value for the gas volume content of the free bubbles is proportional to a difference between an expected value of a density of the medium and the resonator density value,
   wherein the expected value of the medium density is based on a reference density value of the liquid and on the gas volume content of the suspended bubbles, and
   wherein, to determine the value for the gas volume content of the free bubbles, the difference is divided by a product of the expected value of the medium density and a correction factor, wherein the correction factor is not less than 1 and not greater than 4.

2. The method of claim 1, wherein the correction factor depends on an expected mobility and/or a Stokes number of the free bubbles in the liquid.

3. The method of claim 1, wherein the correction factor has the value 2.

4. The method of claim 1, wherein the gas volume content of the suspended bubbles is determined based on the Sorokin equation.

5. The method of claim 1, wherein the resonator density value is determined based on the natural frequencies of the F1 bending vibration mode and the F2 bending vibration mode or the F3 bending vibration mode.

6. The method of claim 1, wherein the measurement sensor has at least two measurement tubes, in which similar bending vibration modes have different natural frequencies, and wherein the resonator density value is determined based on the different natural frequencies of two, similar bending vibration modes.

7. The method of claim 6, wherein the two, similar bending vibration modes are the two F1 bending vibration modes of the different measurement tubes.

8. The method of claim 1, further comprising determining a mixed-phase density value of the medium as a function of the gas volume content of the suspended bubbles and of the gas volume content of the free bubbles.

9. The method of claim 8, wherein the method is carried out iteratively at least in part, and wherein, in a second iteration, the determined mixed-phase density value is substituted for the resonator density value to determine the gas volume content of the suspended bubbles.

10. The method of claim 8, further comprising outputting the mixed-phase density value as a measured value.

11. The method of claim 1, further comprising outputting at least one of the following as measured values: the gas volume content of the free bubbles, the gas volume content of the suspended bubbles, and the sum of the gas volume content of the free bubbles and the gas volume content of the suspended bubbles.

12. A density meter, comprising:
 a measurement sensor comprising at least one measurement tube configured to be excited to vibrate and to guide a flowable medium therethrough;
 an exciter configured to excite vibrations in the at least one measurement tube;
 at least one vibration sensor configured to generate vibration-dependent signals; and
 a measuring and operating circuit configured to drive the exciter, to detect the vibration-dependent signals, and to perform the method according to claim 1.

13. The density meter of claim 12, wherein the at least one measurement tube includes a pair of substantially identical measurement tubes, which are configured to be excited to vibrate relative one another.

* * * * *